US012617976B2

(12) United States Patent
Kumakura et al.

(10) Patent No.: US 12,617,976 B2
(45) Date of Patent: May 5, 2026

(54) METHOD FOR MANUFACTURING JOINED BODY, JOINED BODY, AND HOT-MELT ADHESIVE SHEET

(71) Applicant: DEXERIALS CORPORATION, Shimotsuke (JP)

(72) Inventors: Hiroyuki Kumakura, Shimotsuke (JP); Tomoyuki Abe, Shimotsuke (JP)

(73) Assignee: DEXERIALS CORPORATION, Shimotsuke (JP)

( * ) Notice: Subject to any disclaimer, the term of this patent is extended or adjusted under 35 U.S.C. 154(b) by 821 days.

(21) Appl. No.: 18/008,186

(22) PCT Filed: Jun. 3, 2021

(86) PCT No.: PCT/JP2021/021180
§ 371 (c)(1),
(2) Date: Dec. 5, 2022

(87) PCT Pub. No.: WO2021/246482
PCT Pub. Date: Dec. 9, 2021

(65) Prior Publication Data
US 2023/0287246 A1 Sep. 14, 2023

(30) Foreign Application Priority Data
Jun. 5, 2020 (JP) ................................. 2020-098843

(51) Int. Cl.
*C09J 7/35* (2018.01)
*C09J 11/04* (2006.01)
(Continued)

(52) U.S. Cl.
CPC ................ *C09J 7/35* (2018.01); *C09J 11/04* (2013.01); *C09J 133/24* (2013.01); *C09J 167/06* (2013.01);
(Continued)

(58) Field of Classification Search
CPC ........ C09J 7/35; C09J 11/04; C09J 2203/326; H05K 3/321
See application file for complete search history.

(56) References Cited

U.S. PATENT DOCUMENTS

2015/0237725 A1 8/2015 Yamada et al.

FOREIGN PATENT DOCUMENTS

JP 5964187 B2 8/2016
JP 2017117468 A 6/2017
(Continued)

OTHER PUBLICATIONS

International Search Report issued Aug. 10, 2021 in PCT/JP2021/021180 (with English translation), 6 pages.
(Continued)

*Primary Examiner* — Daniel Mcnally
(74) *Attorney, Agent, or Firm* — Element IP, PLC

(57) ABSTRACT

A method for manufacturing a joined body includes subjecting a first electronic component and a second electronic component to thermocompression bonding with a hot-melt adhesive sheet interposed therebetween. The hot-melt adhesive sheet includes a binder and electroconductive particles. The binder includes a crystalline polyamide resin and a crystalline polyester resin. When a melt viscosity of the hot-melt adhesive sheet is measured under a condition of a heating rate of 5° C./min. the hot-melt adhesive sheet has a ratio of a melt viscosity at 20° C. lower than a thermocompression bonding temperature to a melt viscosity at the thermocompression bonding temperature of 10 or higher.

13 Claims, 2 Drawing Sheets

(51) Int. Cl.
    C09J 133/24        (2006.01)
    C09J 167/06        (2006.01)

(52) U.S. Cl.
    CPC .... *C09J 2203/326* (2013.01); *C09J 2301/312*
         (2020.08); *C09J 2301/408* (2020.08); *C09J*
         *2301/50* (2020.08); *C09J 2427/006* (2013.01)

(56)           References Cited

FOREIGN PATENT DOCUMENTS

| | | | | |
|---|---|---|---|---|
| KR | 20140064651 A | * | 5/2014 | ........... C09J 167/00 |
| WO | WO-2019151188 A1 | * | 8/2019 | ............... C09J 9/02 |

OTHER PUBLICATIONS

Written Opinion issued Aug. 10, 2021 in PCT/JP2021/021180 (with English translation), 6 pages.
Office Action issued Mar. 12, 2024 in Japanese Patent Application No. 2020-098843 (with English translation), 6 pages.

* cited by examiner 42b          41          42a

METHOD FOR MANUFACTURING JOINED BODY, JOINED BODY, AND HOT-MELT ADHESIVE SHEET

TECHNICAL FIELD

The present technology relates to a method of manufacturing a joined body that uses a hot-melt adhesive sheet containing electroconductive particles and to a joined body. This application claims priority based on Japanese Patent Application No. 2020-098843 filed in Japan on Jun. 5, 2020, and the contents of this application is hereby incorporated by reference.

BACKGROUND TECHNOLOGY

Conventionally, connecting materials such as anisotropic conductive film (ACF), anisotropic conductive paste (ACP), or the like have been used as means for connecting electronic components together. ACF is a connecting material that is, for example, conductive particles dispersed in an insulating binder containing thermoset resin in a film shape. ACP is a connecting material that is, for example, conductive particles dispersed in an insulating binder containing thermoset resin in the form of a paste. Binder containing thermoset resin can be thermoset to connect the electrode parts of electronic components to be connected by anisotropic conduction by performing thermo-compression with ACF or ACP therebetween. ACF and ACP are examples of an adhesive film or an adhesive agent containing electroconductive particles.

In recent years, connecting in a short time at low temperature and low pressure has been in demand for connections between electronic components. Connecting at low temperature is in demand from the perspective of reducing thermal damage to electronic components, the perspective of preventing heating temperature variability when connecting, the perspective of reducing the load on mounting equipment, and the like. Connecting at low pressure is in demand from the perspective of damage due to substrate characteristics (substrate thickness, structure, and material) and the like. Connecting in a short time period is in demand from the perspective of productivity and the like.

However, because thermoset resin is used for conventional ACF, attempts to achieve low temperature and short time cause hardening to occur while being stored, so storage duration must be shortened, and therefore this is not suitable for practical use. In addition, from the perspective of productivity, there is demand for storage stability for roughly 1 to 2 years but supporting this with ACF that uses thermoset resin has been difficult.

Here, thermoplastic ACF containing crystalline resin and amorphous resin as an ACF that maintains sufficient connection resistance and enables connecting at low temperature, low pressure, and in a short time has been proposed (for example, see Patent Document 1). This type of ACF and ACP is used for an anisotropic conductive connection between a first electronic component and a second electronic component each having a plurality of opposing terminals and is also used as an anisotropic conductive connection in the case that at least one of the first electronic component or the second electronic component is provided with a full surface electrode. Note, this is of course used for electrical connections for terminals that are full surface electrodes.

However, even with these ACFs, there were cases where sufficient connection reliability was not obtained for the case that the adherend is a difficult-to-adhere material such as PVC (polyvinylchloride).

CITATION LIST

Patent Documents

Patent Document 1: Japanese Patent Number 5964187
Patent Document 2: Japanese Unexamined Patent Application Publication No. 2017-117468

SUMMARY OF INVENTION

Problem to be Solved by Invention

In light of this manner of conventional circumstances, the present technology proposes to provide a method of manufacturing a joined body that can achieve superior adhesive strength and connection reliability, a joined body, and a hot-melt adhesive sheet containing electroconductive particles.

Means to Solve the Problem

A method for manufacturing a joined body according to the present technology is a method for manufacturing a joined body for connecting a conductive portion of a first electronic component and a conductive portion of a second electronic component, including: subjecting the first electronic component and the second electronic component to thermocompression bonding with a hot-melt adhesive sheet containing electroconductive particles containing electroconductive particles in a binder containing crystalline polyamide resin and crystalline polyester resin interposed therebetween; wherein when the melt viscosity of the hot-melt adhesive sheet containing electroconductive particles is measured using a condition of heating rate of 5° C./min, the ratio of the melt viscosity at 20° C. lower than the thermocompression bonding temperature to the melt viscosity at the thermocompression bonding temperature is 10 or higher.

The joined body according to the present technology includes: a first electronic component; a second electronic component; and an adhesive layer connecting a conductive portion of the first electronic component and a conductive portion of the second electronic component; wherein the adhesive layer contains electroconductive particles in a binder containing crystalline polyamide resin and crystalline polyester resin, and when the melt viscosity is measured with a condition of heating rate of 5° C./min, the ratio of the melt viscosity at 100° C. to the melt viscosity at 120° C. is 10 or higher.

The hot-melt adhesive sheet containing electroconductive particles according to the present technology includes: electroconductive particles in a binder containing crystalline polyamide resin and crystalline polyester resin, wherein when the melt viscosity is measured under a condition of heating rate of 5° C./min, the ratio of the melt viscosity at 100° C. to the melt viscosity at 120° C. is 10 or higher.

Effect of the Invention

With the present technology resin flowability can be improved and superior adhesive strength and adhesive reliability can be obtained.

DESCRIPTION OF THE EMBODIMENTS

Figure 1:
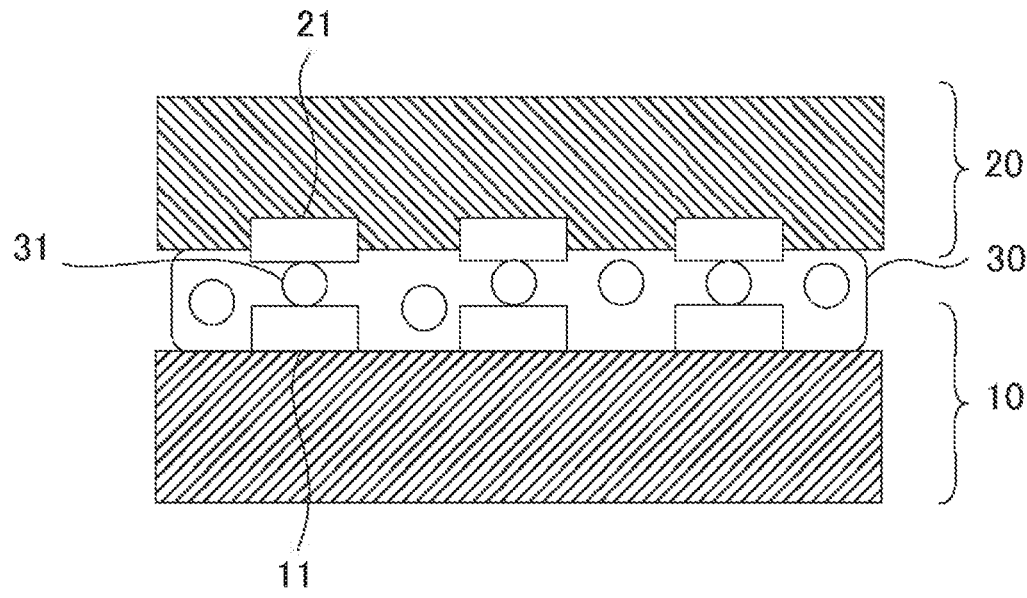
FIG. 1 is a cross-sectional view schematically illustrating an example of a joined body according to the present embodiment.

Embodiments of the present technology will be described in detail below in the following order with reference to the drawings.

1. Joined body
2. Method of manufacturing the joined body
3. Hot-melt adhesive sheet containing electroconductive particles
4. Examples

1. Joined Body

The joined body of the present embodiment includes: a first electronic component, a second electronic component; and an adhesive layer connecting a conductive portion of the first electronic component and a conductive portion of the second electronic component; wherein the adhesive layer contains electroconductive particles in a binder containing crystalline polyamide resin and crystalline polyester resin, and when the melt viscosity is measured with a condition of heating rate of 5° C./min, the ratio of the melt viscosity at 100° C. to the melt viscosity at 120° C. is 10 or higher. Thus, resin flowability can be improved and superior adhesive strength and adhesive reliability can be obtained.

The viscosity of the adhesive layer at 100° C. is preferably 8,000 to 800,000 Pa·s, more preferably 15,000 to 500,000 Pa·s, and even more preferably 20,000 to 300,000 Pa·s. In addition, the viscosity of the adhesive layer at 120° C. is preferably 100 to 20,000 Pa·s, more preferably 500 to 15,000 Pa·s, and even more preferably 1,000 to 8,000 Pa·s. Here, measurement of the melt viscosity of the adhesive layer was performed using, for example, a rotational type Rheometer (manufactured by HAAKE) under conditions of a gap of 0.2 mm, temperature range of 60 to 200° C., heating rate of 5° C./min, measurement frequency of 1 Hz, and measurement plate diameter of 8 mm. Note that melt-viscosity temperature can be set in accordance with base material characteristics and connection manufacturability and so can be changed for the object to be connected and the various conditions for connecting.

FIG. 1 is a cross-sectional view schematically illustrating an example of a joined body according to the present Embodiment. As illustrated in FIG. 1, the joined body includes a first electronic component 10 having a first conductive portion 11, a second electronic component 20 having a second conductive portion 21, and an adhesive layer 30 containing a hot-melt adhesive sheet containing electroconductive particles for connecting the conductive portion 11 of the first electronic component 10 and the conductive portion 21 of the second electronic component 21. Here, the first conductive portion 11 and the second conductive portion 21 are not in particular limited and can be selected from various forms such as an electrode, wire, row of terminals, or the like.

As the first electronic component 10, it can be defined as a card member of a smart card (smart card) or a substrate (so-called printed wiring board: PWB) on which a second electronic component can be mounted. For example, a rigid substrate, a glass substrate, a flexible substrate (FPC: Flexible Printed Circuit), ceramic substrate, and plastic substrate and the like are exemplified.

In addition, examples of the second electronic component 20 include an IC chip of a smart card, an LED (Light Emitting Diode), a driver IC (Integrated Circuit) or other chip (element); a flexible substrate (FPC: Flexible Printed Circuit); components molded from resin; and other components provided with wiring (conductive material).

As described below, the adhesive layer 30 is a hot-melt adhesive sheet containing electroconductive particles that includes conductive particles in a binder in the form of a film. The adhesive layer 30 provides conductivity between the first conductive portion 11 of the first electronic component 10 and the second conductive portion 21 of the second electronic component 20 by the conductive particles 31, and adheres the first electronic component 10 and the second electronic component by the binder. In the case that the first conductive portion 11 and the second conductive portion 21 are configured facing each other with independent sets of electrodes, this constitutes an anisotropic conductive connection and the hot-melt adhesive sheet containing electroconductive particles according to the present technology can be used. In addition, the hot-melt adhesive sheet containing electroconductive particles can be used for (isotropic) conductive connection for the case that the first conductive portion 11 and second conductive portion 21 are each configured with a full surface electrode. Furthermore, the hot-melt adhesive sheet containing electroconductive particles according to the present technology can be used for cases where one conductive portion includes a set of independent electrodes and the other conductive portion is a full surface electrode. This is also true for known anisotropic conductive films. Note that it goes without saying that with regards to conductivity, "anisotropic" is more difficult.

The joined body according to the present embodiment is provided with an adhesive layer containing electroconductive particles in a binder containing a crystalline polyamide resin and a crystalline polyester resin and having a melt viscosity with a prescribed relationship is provided, improving flowability of the resin, and enabling obtaining superior adhesive strength and connection reliability even if a difficult-to-adhere material such as PVC (polyvinylchloride) is used. This is thought to be due to improved wettability of the resin based on the melt viscosity of the binder having a prescribed relationship.

Next, as a specific example of a joined body, a smart card that uses a card member as the first electronic component 10 and an IC chip as the second electronic component will be described. A smart card (smart card) is a card with an Integrated Circuit (IC: Integrated circuit) for recording information (data) and performing calculations and is also called an "IC Card" (Integrated Circuit card) or a "Chip Card" (chip card). In addition, the smart card may be a dual interface card with one IC chip and two interfaces, a contact type and a non-contact type; or may be a hybrid card having a contact type IC chip and a non-contact type IC chip mounted. IC chips used for this smart card differ from IC chips of typical display applications and generally do not have a plurality of terminal rows. The IC chip described below is described as an IC chip used in a smart card.

Figure 2:
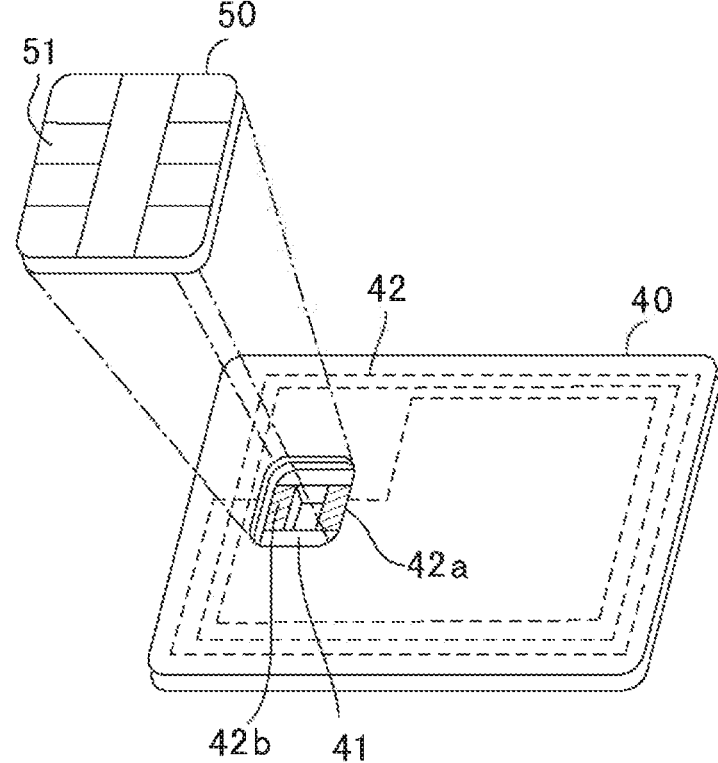
FIG. 2 is a schematic perspective view illustrating an example of a smart card.
Figure 3:
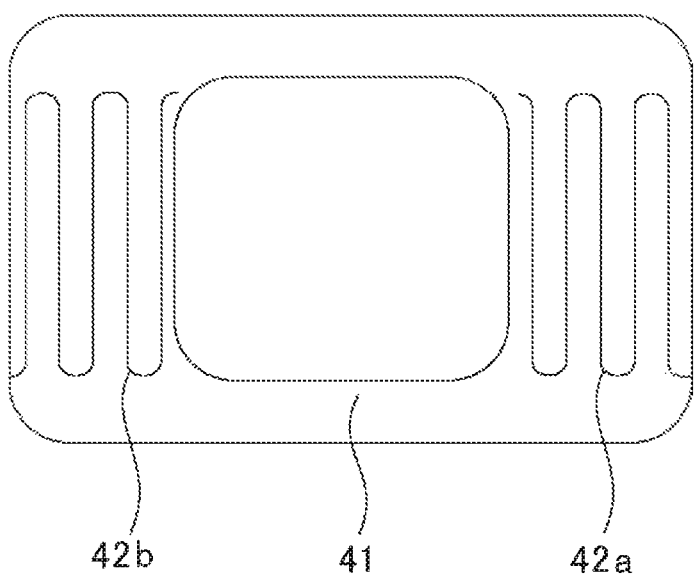
FIG. 3 is a top view illustrating an example of an IC chip area of a card member.

FIG. 2 is a schematic perspective view illustrating an example of a smart card. FIG. 3 is a top view illustrating an example of an IC chip area of a card member. The smart card includes a card member 40 and an IC chip 50. The card member 40 is a laminate body containing a first base material, a second base material provided with an antenna, and a third base material laminated in order. The IC chip 50 has a plurality of contact terminals 51 on the front surface and, for example, a full surface electrode on the back surface.

The first base material, second base material, and third base material are configured as a plurality of layers composed of resin laminated together. Examples of resin contained in each layer include, for example, PVC (polyvinyl chloride), PET (polyethylene terephthalate). PET-G, PC (polycarbonate) and the like. By having a base material composed of a plurality of layers, compared to a configuration of one layer, unnecessary increase in rigidity can be prevented.

The first base material has an opening 41 corresponding to the shape of the IC chip 50 and the opening 41 exposes the second base material, forming the IC chip area. The second base material is arranged between the first base material and the third base material and for example, has an antenna pattern 42 that makes a plurality of turns around the outer periphery thereof on the inside of a layer composed of resin. In addition, the second base material has a recessed part formed by scraping in the IC chip area facing the opening 41 and corresponding to the IC chip 50 so that a part of, for example, an embedded antenna pattern is exposed. In other words, the recessed part of the second base material corresponds to the shape of the opening 41 and a first exposed portion 42*a* and second exposed portion 42*b* of the antenna pattern 42 are formed in the IC chip area. Examples of the metal wire of the antenna pattern 42 include, for example, copper wire.

In addition, the second base material preferably has a groove and a plurality of holes, each of which is a non-through-hole in the IC chip area. This enables the adhesive layer to flow into the groove or hole enabling improving the adhesive force with the adhesive layer. In addition, the shortest length of the groove or hole opening portion is preferably smaller than the average particle diameter of the electroconductive particles. A specific lower limit on the shortest length of the groove or hole opening portion is preferably 20% or more of the average particle diameter of the electroconductive particles, more preferably 30% or more, and particularly preferably 40% or more. In addition, a specific upper limit on the shortest length of the hole opening portion is preferably 80% or less of the average particle diameter of the electroconductive particles, more preferably 70% or less, and particularly preferably 60% or less. Thus, the electroconductive particles fit into the groove or hole more easily, improving the trapping of the electroconductive particles enabling obtaining superior electrical connection with the IC chip.

The adhesive layer is interposed between the IC chip area of the opening 41 and the IC chip 50 and electrically connects the IC chip 50 electrode and the first exposed portion 42*a* and second exposed portion 42*b* of the antenna pattern 42. Note that there are cases where the connection of the IC chip 50 and the antenna pattern 42 is not anisotropic.

A smart card illustrated as a specific example includes is provided with an adhesive layer containing electroconductive particles in a binder containing crystalline polyamide resin and crystalline polyester resin and having a melt viscosity with a prescribed relationship enabling improving flowability of resin and obtaining superior adhesive strength and connection reliability even when a difficult-to-adhere material such as PVC (polyvinylchloride) is used. This is thought to be due to improved wettability of the resin based on the melt viscosity of the binder having a prescribed relationship. Note that this technology can be applied to general anisotropic connectors other than smart cards, for example, FOB composed of rigid substrates and FPC but details are omitted. In addition, for application as the present technology, the method of manufacturing the joined body has substantially the same scope.

2. Method of Manufacturing the Joined Body

The method for manufacturing a joined body according to the present embodiment is a method for manufacturing a joined body for connecting a conductive portion of a first electronic component and a conductive portion of a second electronic component, including: subjecting the first electronic component and the second electronic component to thermocompression bonding with a hot-melt adhesive sheet containing electroconductive particles which contains electroconductive particles in a binder containing crystalline polyamide resin and crystalline polyester resin interposed therebetween; wherein when the melt viscosity of the hot-melt adhesive sheet containing electroconductive particles is measured using a condition of heating rate of 5° C./min, the ratio of the melt viscosity at 20° C. lower than the thermocompression bonding temperature to the melt viscosity at the thermocompression bonding temperature is 10 or higher. Thus, resin flowability can be improved and superior adhesive strength and adhesive reliability can be obtained. The temperature conditions indicated for this viscosity can change depending on the method of manufacturing the joined body.

Hereinafter, an affixing step (A) of affixing the hot-melt adhesive sheet containing electroconductive particles to the second electronic component, a placing step (B) of placing the second electronic component on the first electronic component, and a compression bonding step (C) of subjecting the first electronic component and the second electronic component to thermocompression bonding will be described with reference to FIG. 1.

[Affixing Step (A)]

In the affixing step (A), the hot-melt adhesive sheet containing electroconductive particles is attached to the connecting surface of the second electronic component 20. The affixing step (A) may be a laminating step of laminating the hot-melt adhesive sheet containing electroconductive particles to the connecting surface of the second electronic component or may be a temporary affixing step of affixing the hot-melt adhesive sheet containing electroconductive particles to the connecting surface of the second electronic component 20 at low temperature.

If the affixing step (A) is a laminating step, a pressurizing laminator may be used or a vacuum pressurizing laminator may be used. The affixing step (A) being a laminating step enables mounting over a relatively large surface area at once compared to a temporary affixing step. In addition, if the affixing step (A) is a temporary affixing step, economic benefits are obtained because only minimal changes are required such as tool installation and modification of conventional apparatus.

In the affixing process (A), the temperature that the hot-melt adhesive sheet containing electroconductive particles reaches is preferably at or above the flow temperature of the binder. Here the flow temperature of the binder may be the temperature at which the melt viscosity of the hot-melt adhesive sheet containing electroconductive particles is 100 to 1,000,000 Pa·s and is preferably the temperature achieving 1,000 to 100,000 Pa·s. Thus, the hot-melt adhesive sheet containing electroconductive particles can be affixed to the connecting surface of the second electronic component 20. Note that the melt viscosity of the hot-melt adhesive sheet containing electroconductive particles can be measured using, for example, a rotational type rheometer (manufactured by HAAKE) under the conditions of a gap of 0.2 mm, a temperature range of 60 to 200° C., a heating rate of 5° C./min, a measurement frequency of 1 Hz. and a measurement plate diameter of 8 mm.

[Placing Step (B)]

In the placing step (B), for example, a tool provided with a suction mechanism can be used to pick up the second electronic component 20, align the first electronic component 10 and the second electronic component 20, and place the second electronic component 20 with the hot-melt adhesive sheet containing electroconductive particles interposed therebetween.

[Compression Bonding Step (C)]

In the compression bonding step (C), compression equipment is used to subject the first electronic component 10 and the second electronic component 20 to thermocompression bonding. In the compression bonding step (C), the binder of the hot-melt adhesive sheet containing electroconductive particles is sufficiently removed, sandwiching the electroconductive particles 31 between the conductive portion of the first electronic component 10 and the conductive portion of the second electronic component 20.

In the compression bonding step (C), the temperature that the hot-melt adhesive sheet containing electroconductive particles reaches is preferably at or above the flow temperature of the binder, similar to that of the affixing step (A). Specific temperature reached by the hot-melt adhesive sheet containing electroconductive particles is preferably 100 to 180° C., more preferably 100 to 150° C., and even more preferably 110 to 130° C. As such, thermal shock to the first electronic component 10 and second electronic component 20 can be suppressed, deformation of the joined body can be prevented, and thermal damage to the connected object can be suppressed. In addition, in the compression bonding step (C), thermocompression can be performed a plurality of times to sufficiently remove the binder of the hot-melt adhesive sheet containing electroconductive particles.

The method for manufacturing the joined body according to the present embodiment uses a hot-melt adhesive sheet containing electroconductive particles which contains electroconductive particles in a binder containing crystalline polyamide resin and crystalline polyester resin and having a melt viscosity with a prescribed relationship so even if a difficult-to-adhere material such as PVC (polyvinylchloride) is used, flowability of the resin can be improved and superior adhesive strength and connection reliability can be obtained. This is thought to be due to improved wettability of the resin based on the melt viscosity of the binder having a prescribed relationship.

3. Hot-Melt Adhesive Sheet Containing Electroconductive Particles

The hot-melt adhesive sheet containing electroconductive particles according to the present embodiment includes: electroconductive particles in a binder containing crystalline polyamide resin and crystalline polyester resin, wherein when the melt viscosity is measured under a condition of heating rate of 5° C./min, the ratio of the melt viscosity at 100° C. to the melt viscosity at 120° C. is 10 or higher. Thus, resin flowability can be improved and superior adhesive strength and adhesive reliability can be obtained. The temperature conditions indicated for this viscosity can change depending on the method of manufacturing the joined body.

The lower limit of the thickness of the hot-melt adhesive sheet containing electroconductive particles is preferably 10 µm or more, more preferably 20 µm or more, and even more preferably 30 µm or more. In addition, an upper limit of the thickness of the hot-melt adhesive sheet containing electroconductive particles is preferably 100 µm or less, more preferably 80 µm or less, and even more preferably 60 µm or less. This is suitable for use in manufacturing a smart card where the IC chip is thermocompression-bonded to the card member.

[Binder]

The binder contains at least crystalline polyamide resin and crystalline polyester resin. Specific examples of commercially available crystalline polyamide include, for example, "HX2519" and "M1276" manufactured by Arkema S. A. Note that crystalline resin can be confirmed, for example, using differential scanning calorimetry and observing the endothermic peak during the processing of raising the temperature.

In addition, the binder can contain other components as necessary. Other components such as crystalline resins, amorphous resins, or the like can be suitably selected depending on the purpose. Examples of a crystalline resin are not in particular limited so long as the resin has a crystal area and include, for example, polyolefin resins, polyurethane resins, and the like. Polyester resins include, for example, polyethylene terephthalate resin, polybutylene terephthalate resin, and the like, while polyolefin resins include, for example, polyethylene resin, polypropylene resin, polybutylene resin, and the like. In addition, examples of amorphous resins are the same as those mentioned in the description of crystalline resins.

The total amount of crystalline polyamide resin and crystalline polyester resin in the binder is preferably 50 to 100 wt %, more preferably 80 to 100 wt %, and even more preferably 90 to 100 wt %. In addition, the mass ratio of the crystalline polyamide resin and the crystalline polyester resin is preferably 10:90 to 90:10, more preferably 10:90 to 75:25, and even more preferably 25:75 to 75:25. Thus, a prescribed relationship of melt viscosity can be easily obtained and resin flowability can be improved and superior adhesive strength and connection reliability can be obtained.

[Electroconductive Particles]

There are no particular limitations for the electroconductive particles and they can be suitably selected according to the purpose. Examples include metal particles, metal coated metal particles, in which an electroconductive material is coated with a different electroconductive material, and particles that are an insulating material coated with an electroconductive material: for example, metal coated resin particles or metal coated glass particles. From the perspective of prevention of surface oxidation and electrical conductivity, the outer layer of the electroconductive particles is preferably one or more types selected from a group consisting of nickel, silver, solder, copper, gold, and palladium.

Metal particles are not in particular limited and can be suitably selected according to purpose. Examples include nickel, cobalt, silver, copper, gold, palladium, solder, and the like. One type of metal particles can be used, or two or more types can be used in combination. For the purpose of lowering resistance or preventing surface oxidation, these metal particles may have a metal layer such as silver, gold, or palladium that is different from the metal particles, applied to the surface thereof. Use of a material with a metal layer that is different from the metal particles (such as plated) provided thereon enables improving conduction performance. Providing a different metal layer with a higher electrical conductivity on the outermost layer of the metal particles reduces resistance, broadens selections of material combinations of the conductive portion, and more readily enables avoiding problems such as corrosion. Furthermore, there may be metallic protrusions on the surface or insulation processing may be applied.

Regarding metal coated resin particles, there are no limitations in particular so long as the particles are a resin particle with metal coated on the surface and can be suitably selected according to the purpose. Examples include resin particles the surface of which is coated with at least one of the metals of nickel, silver, solder, copper, gold, or palladium. Furthermore, there may be metallic protrusions on the surface or insulation processing may be applied. For the case of connections considering low resistance, particles with silver coated on the surface of a resin particle are preferable.

There are no particular limitations on the method of coating a metal on the resin particle and the method can be suitably selected according to the purpose, and examples include electroless plating method and sputtering method. There are no particular limitations on the resin particle material and the material can be suitably selected according to the purpose. Examples include styrene-divinylbenzene copolymer, benzoguanamine resin, cross-linked polystyrene resin, acrylic resin, styrene-silica composite resin, and the like.

Relative to 100 parts by weight of the binder, the lower limit of the mass ratio range of the formulation amount of the electroconductive particles is preferably 20 parts by mass or more, more preferably 25 parts by mass or more, and even more preferably 30 parts by mass or more. Relative to 100 parts by weight of the binder the upper limit of the mass ratio range of the formulation amount of the electroconductive particles is preferably 450 parts by mass or less, more preferably 320 parts by mass or less, and even more preferably, 100 parts by mass or less. The formulation amount of the electroconductive particles can also be converted to a volume equivalent.

If the formulation amount of the electroconductive particles is insufficient, superior conductivity cannot be obtained and if the formulation amount is too much, sufficient adhesive strength cannot be obtained and superior electroconductive reliability is more difficult to obtain. Note that in the case that electroconductive particles are present in a binder, volume ratio may be used while for the case of manufacturing a hot-melt adhesive sheet containing electroconductive particles (prior to electroconductive particles being present in a binder), mass ratio may be used. Mass ratio can be converted to volume ratio from the specific gravity of the component and the blending ratio.

In addition, the electroconductive particles may be kneaded and dispersed in the resin of the hot-melt adhesive sheet containing electroconductive particles or they may be spaced apart. This arrangement may be an arrangement based on a certain specification. Examples of the form of the specified arrangement include a square lattice, a hexagonal lattice, an orthorhombic lattice, a rectangular lattice, or the like lattice arrangement. In addition, the electroconductive particles may be arranged as an agglomerate of several particles agglomerated together. In this case, the arrangement of the agglomerates in plan view of the hot-melt adhesive sheet containing electroconductive particles may be a specified arrangement or a random arrangement, similar to the arrangement of electroconductive particles described above.

The average particle diameter of the electroconductive particles is preferably 70% or more of the thickness of the hot-melt adhesive sheet containing electroconductive particles, more preferably 80% or more, and even more preferably 95% or more. Here, the electroconductive particles can easily be sandwiched between the conductive section of the first electronic component and the conductive section of the second electronic component when performing thermo-compression bonding.

The lower limit of the average particle diameter of the electroconductive particles is preferably 10 μm or more, more preferably 15 μm or more, and even more preferably 20 μm or more. In addition, the upper limit of the average particle diameter of the electroconductive particles is preferably 50 μm or less, more preferably 45 μm or less, and even more preferably 40 μm or less. In addition, the maximum diameter of the electroconductive particles can be set to 200% or less than the average particle diameter, preferably 150% or less than the average particle diameter, and even more preferably 120% or less than the average particle diameter. If the maximum diameter of the electroconductive particles is within the range described above, the electroconductive particles can be sandwiched between the conductive portion of the first electronic component and the conductive portion of the second electronic component enabling the electroconductive particles to connect between the conductive sections by means of contact.

In addition, the electroconductive particles may be an agglomerate of a plurality agglomerated together. In the case of an agglomerate of a plurality of electroconductive particles agglomerated together, the size of the agglomerate may be set to the same average particle diameter as the aforementioned electroconductive particles. Note that the size of the agglomerate can be determined by observation using an electron microscope or an optical microscope.

Here, the average particle diameter of the electroconductive particles is the average value of the measured diameter of the major axis of the particle measured for, for example. N=20 or more, preferably N=50 or more, and more preferably for N=200 or more particles in an image observed using an electron microscope such as a metallurgical microscope, an optical microscope, or a SEM (Scanning Electron Microscope) and in the case the particles are spherical, this is the average value of the diameter of the particles. In addition, the observation images may be measurement values from analysis using commercially available image analysis software ("WinROOF": Mitani Corporation. A-zo kun (registered trademark): Asahi Kasei Engineering Corporation and the like) or measurement values (N=1000 or more) measured using an image type particle size distribution analyzer (example: FPIA-3000 (Malvern)). The average particle diameter determined from the observation imager or image type particle size distribution analyzer can be taken as the average value of the maximum length of the particle. Note that when preparing hot-melt adhesive sheet containing electroconductive particles, the particle size in which cumulative frequency of the particle size distribution determined using a laser diffraction-scattering method is 50% (D50) or arithmetic mean diameter (preferably on a volume basis) or the like manufacturer value can be used as a simplified means.

[Other Additives]

Regarding the hot-melt adhesive sheet containing electroconductive particles, in addition to the binder and electroconductive particles described above, to the extent that the effect of the present technology is not impaired, various additives can be blended in. For example, to improve gas barrier properties and the elastic modulus, nano-size (primary particle size is 1 nm or more to less than 1,000 nm) silica can be dispersed. In addition, to the extent that the effect of the present technology is not impaired, thermoset resin and curing agent may be added.

The hot-melt adhesive sheet containing electroconductive particles according to the present embodiment includes electroconductive particles in a binder containing crystalline polyamide and with a melt viscosity having a prescribed relationship so even if a difficult-to-adhere material such as PVC (polyvinylchloride) is used, flowability of the resin can be improved and superior adhesive strength and connection reliability can be obtained. This is thought to be due to improved wettability of the resin based on the melt viscosity of the binder having a prescribed relationship.

[Method for Manufacturing the Hot-Melt Adhesive Sheet Containing Electroconductive Particles]

The method for manufacturing the hot-melt adhesive sheet containing electroconductive particles includes a varnish preparation step of dissolving each resin component of the binder in a solvent, a step of preparing an electroconductive particle containing resin composition for obtaining an electroconductive particle containing resin composition to which electroconductive particles are added, and a drying step of coating the electroconductive particle containing resin composition on a peelable base material to a prescribed thickness and drying. Note that if the electroconductive particles in the hot-melt adhesive sheet containing electroconductive particles are arranged spaced apart or have a specified arrangement, the sheet can be provided without adding the electroconductive particles and the electroconductive particles can be arranged using a separate known method.

There is no particular limitations for the solvent used for various resin components and can be suitably selected according to the purpose, and, for example, methyl ethyl ketone:toluene:cyclohexanone solvent mixture at 50:40:10 (mass ratio) or toluene:ethyl acetate solvent mixture at 50:50 (mass ratio) can be used.

In addition, examples of peelable base materials are materials with a contact angle with water of 80° or higher. Specific examples of a peelable base material include silicone film, fluorine film, silicone film, and PET. PEN, or glassine paper release treated with a fluorine based release agent. In addition, there are no particular limitations of the thickness of the peelable base material and this can be suitably selected according to the purpose but is preferably 20 μm to 120 μm.

In addition, the hot-melt adhesive sheet containing electroconductive particles may be molded into a tape form and supplied as a film roll wound around a core. The diameter of the core is not in particular limited and can be suitably selected according to the purpose but is preferably 50 to 1000 mm. There are no particular limitations regarding the film length and prototype production using a manufacturing device is feasible if 5 m or more while if 1000 m or less, workability and handling burden is not too severe.

EXAMPLES

4. Examples

In the present examples, a hot-melt adhesive sheet containing electroconductive particles was prepared and this was used to prepare a joined body. Furthermore, the initial bond strength of the joined body and connection reliability were evaluated. Note that the present invention is not limited to these examples.

[Preparation of Hot-Melt Adhesive Sheet Containing Electroconductive Particles]

The following resins were prepared.

M1276 (manufactured by Arkema S. A., crystalline polyamide)→solids/ethanol/toluene=>solution prepared at 30/35/35

TPAE826-4S (manufactured by T&K TOKA, amorphous polyamide elastomer)→solids/ethanol/toluene=>solution prepared at 30/35/35

PES111EE (manufactured by Toagosei, crystalline polyester)→solids/cyclohexanone=>solution prepared at 25/75

PES120L (manufactured by Toagosei, crystalline polyester)→solids/cyclohexanone=>solution prepared at 25/75

PES310S30 (manufactured by Toagosei, product of amorphous polyester dissolved in solvent, solids/toluene/MEK=30/56/14)

PES360HVXM30 (manufactured by Toagosei, product of amorphous polyester dissolved in solvent, solids/toluene/ethylbenzene/MIBK/xylene/MEK=30/30/15/15/7.5/2.5)

As shown in Table 1 and Table 2, the resins described above were mixed and stirred with the prescribed formulation amount (parts by mass) of resin as solids to obtain mixed varnish. Next, 36 parts by mass of spherical Ag plated Cu particles (average particle diameter 38 μm. Ag content 10%) relative to 100 parts by mass of the obtained mixed varnish was added to the obtained mixed varnish to obtain an electroconductive particle containing resin composition. The electroconductive particle containing resin composition thus obtained was coated on a 50 μm thick PET film in a manner so as to achieve a 40 μm average thickness after drying and then dried for 5 minutes at 70° C. and then for 5 minutes at 120° C. to prepare a hot-melt adhesive sheet containing electroconductive particles.

[Measurement of Melt Viscosity]

An 8 mm diameter sensor and plate was equipped on a rheometer MARS 3 (manufactured by HAAKE) and the hot-melt adhesive sheet containing electroconductive particles was set thereon. Furthermore, the melt viscosity was measured under conditions of a gap of 0.2 mm, a heating rate of 5° C./min, a frequency of 1 Hz, and a measurement temperature range of 60 to 200° C. The viscosity at 100° C. (V1) and the viscosity at 120° C. (V2) were captured and the ratio thereof (V1/V2) was calculated. Note that the viscosity (V1) of the Examples and Comparative Examples at 100° C. is 20,000 to 300,000 Pa·s and the viscosity (V2) of the Examples and Comparative Examples at 120° C. is 1,000 to 8,000 Pa·s.

[Preparation of a Joined Body]

A printed wiring board [0.4 mm pitch (line/space=0.2/0.2 mm), glass epoxy base material, thickness of 1.0 mm, copper pattern thickness of 35 μm, nickel/gold plated] was used as the first electronic component.

A flexible printed board [0.4 mm pitch (line/space=0.2/0.2 mm), PVC (polyvinylchloride) base material, thickness 50 μm, copper pattern thickness of 12 μm, nickel/gold plated] was used as the second electronic component.

Hot-melt adhesive sheet containing electroconductive particles was cut to a width of 2.0 mm and temporarily bonded to a conductive portion of the printed wiring board under conditions of 120° C., 1 MPa, and 1 second. Next, the flexible printed board was placed on the hot-melt adhesive sheet containing electroconductive particles. Next, the flexible printed board was heated and compressed with a heating tool (width of 2.0 mm) via a cushioning material (silicone rubber, thickness of 0.2 mm) under conditions of 120° C., 2 MPa, and 3 seconds to obtain the joined body.

[Adhesive Strength Evaluation]

A 90° peel test (JIS K6854-1) of peeling the flexible printed board from the printed wiring board at a direction of 90° was performed. In the peel test, adhesive strength was measured on a test piece cut 1 cm wide, and adhesive strength was evaluated using the following evaluation criteria.

A: Adhesive strength is 15 N/cm or higher

B: Adhesive strength of 10 N/cm or more and less than 15 N/cm

C: Adhesive strength is less than 10 N/cm

[Connection Reliability Evaluation]

After the high temperature high humidity test of the joined body (at rest for 500 hours in 60° C. and 95% RH environment) and after the heat cycle test (−40° C. for 30 minutes and then 100° C. for 30 minutes for 500 cycles), the resistance value was measured using a digital multimeter applying a 1 mA current and using the four terminal method. Resistance value was measured for 30 channels and the maximum resistance value was evaluated using the following evaluation criteria.

A: Resistance less than 0.1 Ω

B: Resistance 0.1 Ω or more and less than 0.15 Ω

C: Resistance 0.15 Ω or higher

Table 1 shows the formulation, melt viscosity, adhesive strength evaluation, and connection reliability evaluation of the hot-melt adhesive sheets containing conductive particles for Examples 1-6. In addition, Table 2 shows the formulation, melt viscosity, adhesive strength evaluation, and connection reliability evaluation of the hot-melt adhesive sheets containing conductive particles for Comparative Examples 1-5. For practical purposes, all parameters should be B or higher.

TABLE 1

| | | Example 1 | Example 2 | Example 3 | Example 4 | Example 5 | Example 6 |
|---|---|---|---|---|---|---|---|
| Crystalline Polyamide | M1276 | 90 | 75 | 50 | 25 | 10 | 75 |
| Crystalline Polyester | PES-111EE | 10 | 25 | 50 | 75 | 90 | — |
| Crystalline Polyester | PES-120L | — | — | — | — | — | 25 |
| Electroconductive Particles | Ag plated Cu particles | 36 | 36 | 36 | 36 | 36 | 36 |
| Melt viscosity ratio | V1/V2 | 29.4 | 15.5 | 16.9 | 17.1 | 18.0 | 17.7 |
| Adhesion Strength [N/cm] | Initial | 16.6 A | 17.4 A | 18.0 A | 17.2 A | 17.0 A | 18.7 A |
| Connection Reliability | 60° C., 95% RH- 500 h | A | A | A | A | A | A |
| | TCT-500 cycles | A | A | A | A | A | A |

TABLE 2

| | | Comparative Example 1 | Comparative Example 2 | Comparative Example 3 | Comparative Example 4 | Comparative Example 5 |
|---|---|---|---|---|---|---|
| Crystalline Polyamide | M1276 | 100 | — | 75 | 75 | — |
| Amorphous Polyamide | TPAE826-4S | — | — | — | — | 75 |
| Crystalline Polyester | PES-111EE | — | 100 | — | — | 25 |
| Amorphous Polyester | PES-310 | — | — | 25 | — | — |
| Amorphous Polyester | PES-360 | — | — | — | 25 | — |
| Electroconductive Particles | Ag plated Cu particles | 36 | 36 | 36 | 36 | 36 |
| Melt viscosity ratio | V1/V2 | 32.3 | 22.6 | 6.7 | 9.2 | 5.0 |
| Adhesive strength [N/cm] | Initial | 5.8 C | 12.5 B | 14.0 B | 8.1 C | 6.3 C |
| Connection Reliability | 60° C., 95% RH- 500 h | C | A | A | A | C |
| | TCT-500 cycles | A | C | C | C | C |

In Comparative Examples 1 and 2, the value of V1/V2 was 10 or more, and the viscosity change was large near the temporary bonding temperature. The adhesive strength was lower than that of the Examples, and sufficient connection reliability could not be obtained although they showed sufficient wettability to the adherent. In Comparative Examples 3 to 5, the value of V1/V2 was less than 10 and the viscosity change around the temporary bonding temperature was small so adhesion strength was low and sufficient connection reliability could not be obtained. On the other hand, in Examples 1 to 6, the value of V1/V2 is 10 or more, and the viscosity change is large around the temporary bonding temperature indicating favorable wettability to the adherend and favorable results in terms of both adhesive strength and connection reliability.

REFERENCE SIGNS LIST

10 First electronic component, 11 First conductive portion, 20 Second electronic component, 21 Second conductive portion, 30 Adhesive layer, 31 Electroconductive particles, 40 Card member, 41 Opening, 42 Antenna pattern, 42a First exposed portion, 42b Second exposed portion, 50 IC chip, 51 Contact terminal

The invention claimed is:

1. A method for manufacturing a joined body, the method comprising subjecting a first electronic component comprising a first conductive portion and a second electronic component comprising a second conductive portion to thermocompression bonding with a hot-melt adhesive sheet interposed therebetween, to connect the first conductive portion and the second conductive portion, the hot-melt adhesive sheet comprising a binder and electroconductive particles, the binder comprising a crystalline polyamide resin and a crystalline polyester resin, wherein when a melt viscosity of the hot-melt adhesive sheet is measured under a condition of a heating rate of 5° C./min, the hot-melt adhesive sheet has a ratio of a melt viscosity at 20° C. lower than a thermocompression bonding temperature to a melt viscosity at the thermocompression bonding temperature of 10 or higher.

2. The method according to claim 1, wherein when the melt viscosity of the hot-melt adhesive sheet is measured under the condition of 5° C./min, the hot-melt adhesive sheet has a ratio of a melt viscosity at 100° C. to a melt viscosity at 120° C. of 10 or higher.

3. The method according to claim 1, wherein a mass ratio of the crystalline polyamide resin and the crystalline polyester resin is from 10:90 to 90:10.

4. The method according to claim 1, wherein the electroconductive particles comprise:

a base particle made of a first electroconductive material; and a coating layer provided on a surface of the base material and made of a second electroconductive material which is different from the first electroconductive material.

5. The method according to claim 1, wherein an average particle diameter of the electroconductive particles is 70% or more than a thickness of the hot-melt adhesive sheet.

6. The method according to claim 1, wherein each of the first electronic component and the second electronic component comprises a base material, and the base material of at least one of the first electronic component and the second electronic component is composed of polyvinyl chloride.

7. The method according to claim 1, wherein the thermocompression bonding temperature is from 110° C. to 130° C.

8. A joined body comprising:

a first electronic component comprising a first conductive portion;

a second electronic component comprising a second conductive portion; and an adhesive layer connecting the first conductive portion and the second conductive portion, wherein the adhesive layer comprises;

a binder comprising a crystalline polyamide resin and a crystalline polyester resin; and electroconductive particles, and when a melt viscosity is measured under a condition of a heating rate of 5° C./min, the adhesive layer has a ratio of a melt viscosity at 100° C. to a melt viscosity at 120° C. of 10 or higher.

9. The joined body according to claim 8, wherein each of the first electronic component and the second electronic component comprises a base material, and the base material of at least one of the first electronic component and the second electronic component is composed of polyvinyl chloride.

10. A hot-melt adhesive sheet comprising:

electroconductive particles; and a binder comprising a crystalline polyamide resin and a crystalline polyester resin, wherein when a melt viscosity is measured under a condition of a heating rate of 5° C./min, the hot-melt adhesive sheet has a ratio of a melt viscosity at 100° C. to a melt viscosity at 120° C. of 10 or higher.

11. The hot-melt adhesive sheet according to claim 10, wherein a mass ratio of the crystalline polyamide resin and the crystalline polyester resin is 10:90 to 90:10.

12. The hot-melt adhesive sheet according to claim 10, wherein the electroconductive particles comprise:

a base particle made of a first electroconductive material; and a coating layer provided on a surface of the base material and made of a second electroconductive material which is different from the first electroconductive material.

13. The hot-melt adhesive sheet according to claim 10, wherein an average particle diameter of the electroconductive particles is 70% or more than a thickness of the hot-melt adhesive sheet.

* * * * *